Oct. 29, 1946.  L. P. FRIEDER  2,410,207
PARACHUTE
Filed Oct. 25, 1941  2 Sheets-Sheet 2

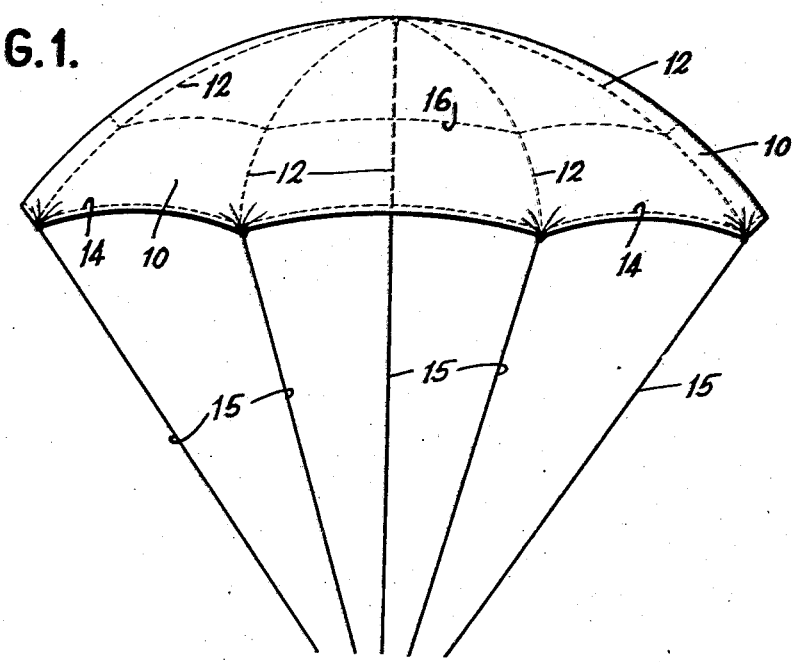
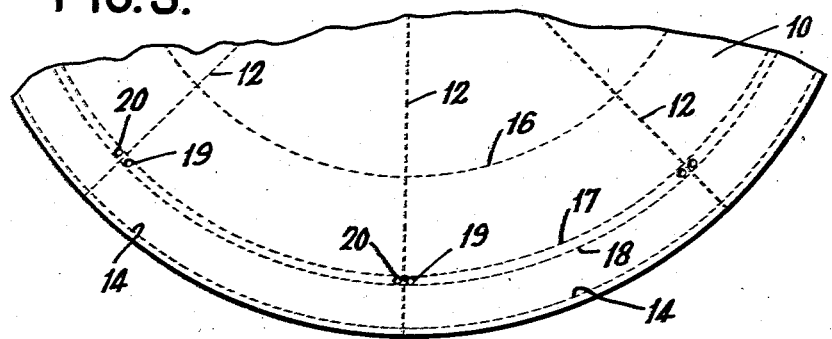
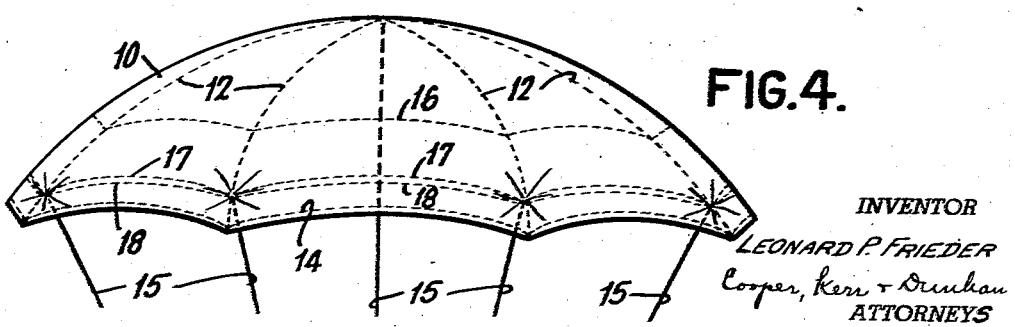

INVENTOR
LEONARD P. FRIEDER
Cooper, Kerr & Dunham
ATTORNEYS

Patented Oct. 29, 1946

2,410,207

UNITED STATES PATENT OFFICE 2,410,207

PARACHUTE

Leonard P. Frieder, New York, N. Y.

Application October 25, 1941, Serial No. 416,479

4 Claims. (Cl. 244—142)

This invention relates generally to parachutes for retarding the speed of falling bodies and has particular reference to parachutes for use in connection with magnesium flares and signals of various kinds.

One object of the invention is to provide a low cost parachute for the purposes indicated, this being of particular importance because of the fact that the parachutes are usually not recovered after being used.

Paper parachutes have been used in connection with magnesium flares and signals but they have heretofore had many disadvantages, one being the relatively high cost and another being that they were not uniformly reliable. Owing to the structure the sail or canopy was often damaged to an extent where it would not properly support the load and the percentages in which the parachute failed to open were entirely too high. This latter defect was a serious one, particularly where the parachute was used over a terrain in which fires might be started by dropping lighted magnesium flares which were not retarded by the parachute. These defects were in large part due to the fact that the paper parachutes heretofore used were constructed by sewing together triangular gores of paper, thereby producing a plurality of seams which made it difficult to pack a parachute in the container from which it was to be discharged after reaching the desired elevation. This defect or source of trouble has been overcome by the present invention. It contemplates the use of a single sheet of paper and reinforcing that sheet in such a way that it is strengthened at stress points without interfering with the proper functioning of the parachute. The parachute of this invention will easily fold or collapse into the container and there are no seams which will interfere with the proper opening of the canopy when the parachute is discharged from the container.

While the parachute of the present invention is intended primarily for use in connection with flares and signals, it is not limited to such use as it can be used in various sizes for other purposes.

With the foregoing and other and incidental objects in view the invention consists in a novel construction and arrangement of component parts, embodiments of which are shown in the drawings accompanying and forming a part of this application, with the novel features being pointed out in the claims appended hereto.

In said drawings:

Fig. 1 is a side view illustrating the construction of the reinforced canopy and the attached shroud lines.

Fig. 3 is a partial top plan view of a modification of the canopy and its reinforcement.

Fig. 4 is a side view of the canopy of Fig. 3 and shows the method of attaching the shroud lines.

Figure 2:
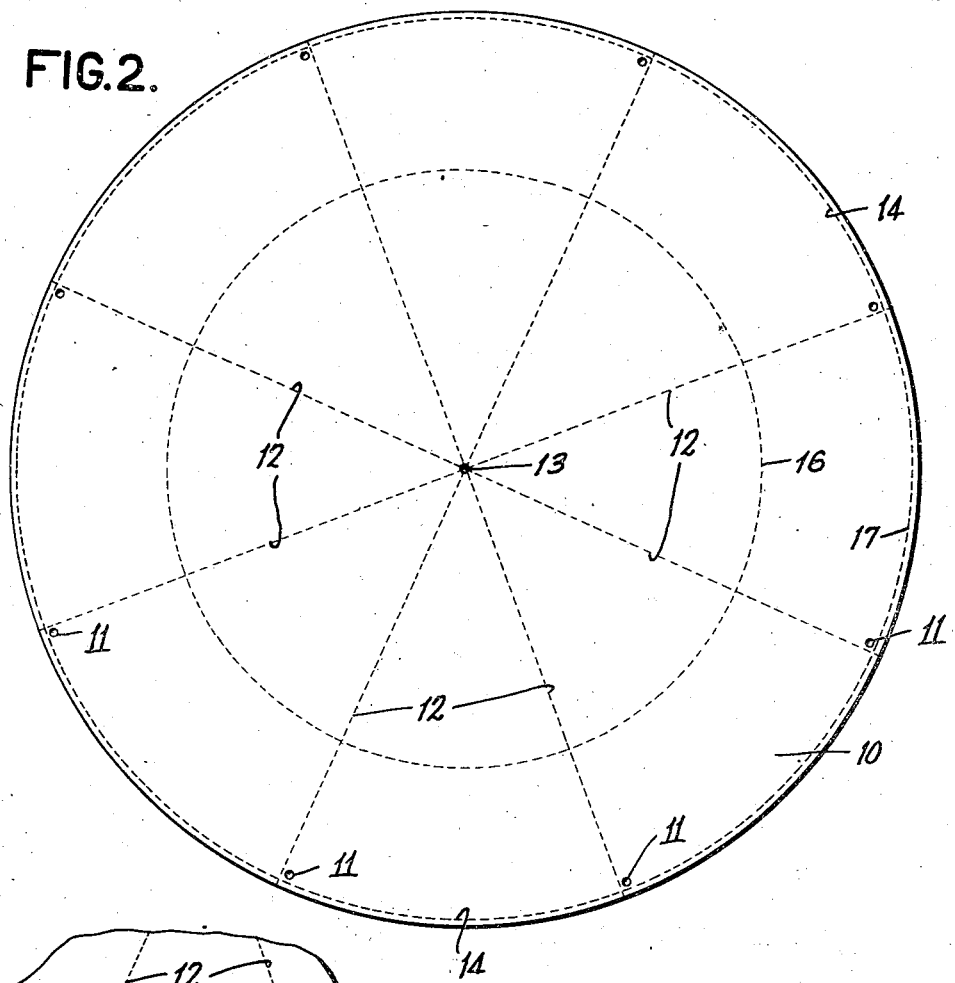
Fig. 2 is a top plan view of the reinforced canopy.

Referring to Figs. 1 and 2, the canopy or sail 10 is in the form of a circular disk or sheet of paper. The paper employed is preferably one in which there is little or no grain; that is, a paper which has substantially equal strength in all directions. However, for most purposes this grainless paper is not required as the construction is such that paper which is considerably weaker across the grain than with the grain may be employed. This is an advantage in view of the fact that paper of the latter kind is less expensive than the grainless paper.

The disks or sheets of paper for the canopy 10 may be cut by dies and are, in the form shown in Figs. 1 and 2, perforated near the margin as shown at 11. These perforations are preferably made before the reinforcing has been applied. This reinforcing includes applying to the paper threads 12 extending radially from the center of the sail. These threads may be treated with adhesive and then applied, but it is preferred to use a long sewing machine stitch in which the needle thread has a reduced tension which will result in the shuttle thread being substantially straight. The straight shuttle thread will be the main reinforcing thread and owing to the manner in which it is held by the loops of the needle thread it will have substantially no tendency to cut the paper when the sail is supporting a load. It is preferred to have the shuttle thread on the outer or upper side of the sail. As a matter of manufacturing convenience the sail, when it is cut, can be spotted at the center as indicated at 13 and the sewing then done in straight lines from edge-to-edge through the center in applying the reinforcing threads.

The sail is further reinforced by a similar application of reinforcing thread 14 held by stitching around the sail close to its margin. The reinforcing threads are all of small cross-section and owing to this and the way in which they are applied, there is little added to the bulk or weight of the sail and nothing which will interfere with the proper folding and packing of the sail in the container or its subsequent opening when ejected from the container to support flares or signals.

The shroud lines 15 are secured at their upper ends to the canopy or sail at the points where the radial threads intersect the circumferential threads 14. In tying each shroud line it is passed through one of the perforations 11 and then the adjacent edge of the canopy pulled out and a knot tied in the line which includes within the knot the intersecting threads 12 and 14 and a part of the paper of the sail. This method of tying gives a direct connection between the radial reinforcing threads 12 as well as the circumferential threads 14. When the parachute opens with the load attached the canopy 10 will assume substantially the shape indicated in Fig. 1.

It has been observed in repeated tests that when the canopy opens to assume its load any shock taken by the canopy is localized in a zone extending around the canopy parallel to the edge of the canopy and at a distance from the edge of about one-third of the total radius of the canopy. This localization of shock stress was particularly noticeable with the prior art gored parachute and in the present invention a reinforcing thread 16 through the zone is applied in the same manner as the threads 12 and 14, thereby reinforcing the paper around the zone indicated. This is a particularly valuable feature where paper is used having a substantial grain; that is, where the paper is much weaker across the grain than lengthwise of the grain.

The construction illustrated in Figs. 3 and 4 is the same as the one previously described, except that the sail or canopy is reinforced by additional threads 17 and 18 applied in the same way as the other reinforcing threads and extending in concentric circles parallel to the edge of the sail. Where these additional threads are employed the shroud lines may be passed through double perforations 19 and 20 at either side of the radial thread 12 and then the threads 12, 17 and 18, and some of the paper of the sail may be drawn out and included in the knot by which the upper end of the shroud line is secured to the sail. This is illustrated in Fig. 4.

Figure 5:
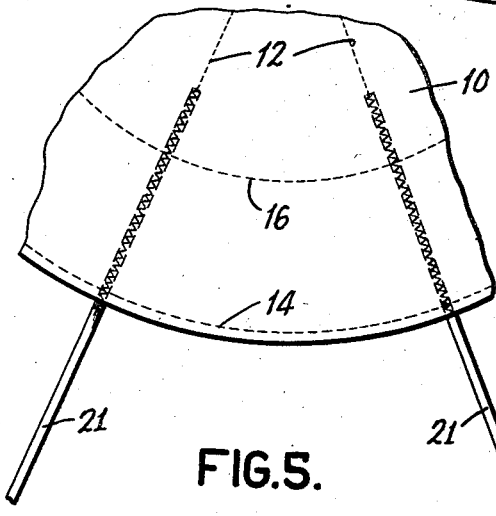
Fig. 5 shows a modification in which tapes are used to serve as shroud lines or lanyards.

The construction shown in Fig. 5 is the same as that shown in Figs. 1 and 2, except that narrow flexible tapes 21 are used for shroud lines. These tapes have some advantages including the fact that they can be extended across the reinforcement threads 14 and 16 and secured in place as an incident to stitching the radial threads 12 in place.

Figure 6:
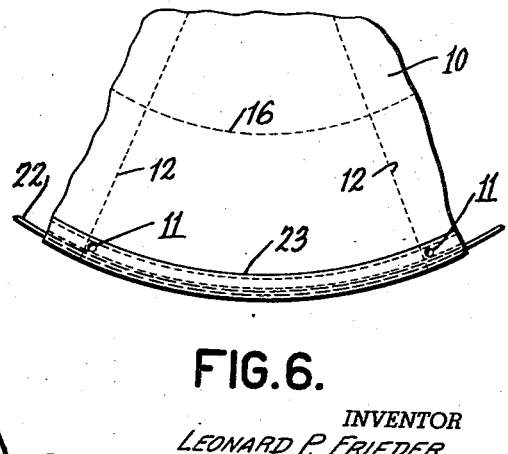
Fig. 6 shows a further modification in which the edge of the canopy or sail is reinforced by a cord which is hemmed in around the edge of the canopy.

The construction illustrated in Fig. 6 is for use with large canopies supporting heavy loads. The paper of the sail 10 may be folded inward and stitched to form a hem enclosing a cord 22, or a separate piece of paper in the form of a tape or band may be folded to enclose the cord 22 and then stitched along the line 23 to attach the tape and its enclosed cord 22 to the margin of the sail 10. In this construction the shroud lines are attached as above described in connection with Figs. 1 and 2, but in tying the knots at the upper end of the shroud lines the cord 22 is included in the tying.

The construction as described permits the use of a paper sail which is light in weight and of a texture which will not readily take a permanent crease in folding, the paper employed being somewhat in the nature of a strong tissue paper. While it is not an essential thing, it may be advisable to treat the paper in any of the well known ways to make it water-proof or at least partially non-absorbent where the parachute must be packed and stored in a humid atmosphere.

Parachutes constructed according to the invention flower almost instantly when discharged or released and support reliably loads which are heavier in proportion to the supporting area of the sail than was practical with prior devices of the kind. The construction is simple and involves no serious manufacturing difficulties and as a result the entire structure can be produced with a minimum outlay for material, labor and equipment.

While the invention has been explained in considerable detail with reference to the drawings, it is not the intention to be limited by anything hereinabove contained, except to the extent indicated by the claims which follow.

What is claimed is:

1. A parachute having in combination a canopy or sail consisting of a substantially circular one-piece sheet of paper, reinforcing threads stitched to and extending radially of said sheet, a reinforcing thread stitched to and extending circumferentially of the sheet near the margin of the sheet, and shroud lines secured at their upper ends to the canopy at the points where the radial and the circumferential threads intersect.

2. A parachute comprising a canopy or sail consisting of a substantially circular one-piece sheet of paper, and reinforcing stitched seams extending radially and in concentric circles around the center of the sail, each of said seams consisting of a substantially straight shuttle thread held in place by relatively loose loops in the needle thread extending through the paper and around the shuttle thread.

3. A parachute comprising a canopy or sail consisting of a substantially circular one-piece sheet of paper and reinforcing stitched seams extending radially of the sail, each of the said seams consisting of a substantially straight shuttle thread held in place by relatively loose loops in a needle thread extending through the paper and around the shuttle thread.

4. In a parachute, a one-piece circular paper canopy, reinforcing threads held by thread loops through the paper along a plurality of equidistant radial lines, a reinforcing thread held by thread loops through the paper on a circular line having the center of the canopy as the center of the circle, said circle having a diameter of approximately two-thirds of the diameter of the canopy and shroud lines attached to the canopy in alignment with at least some of the aforesaid radial threads.

LEONARD P. FRIEDER.